(12) United States Patent
Liu et al.

(10) Patent No.: US 11,671,981 B2
(45) Date of Patent: Jun. 6, 2023

(54) MULTI-TTI SELECTIVE GRANT FOR SIDELINK COMMUNICATION IN UNLICENSED SPECTRUM

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 124 days.

(21) Appl. No.: 17/234,344

(22) Filed: Apr. 19, 2021

(65) Prior Publication Data
US 2022/0338175 A1    Oct. 20, 2022

(51) Int. Cl.
*H04W 72/04* (2023.01)
*H04W 74/08* (2009.01)
*H04W 76/14* (2018.01)
*H04L 5/00* (2006.01)
*H04L 1/18* (2023.01)
*H04W 72/23* (2023.01)
*H04W 72/0446* (2023.01)
*H04L 1/1812* (2023.01)
*H04L 1/1829* (2023.01)

(52) U.S. Cl.
CPC ........... *H04W 72/23* (2023.01); *H04L 1/1812* (2013.01); *H04L 1/1861* (2013.01); *H04L 5/0055* (2013.01); *H04W 72/0446* (2013.01); *H04W 74/08* (2013.01); *H04W 76/14* (2018.02)

(58) Field of Classification Search
CPC ... H04W 28/04; H04W 72/04; H04W 72/042; H04W 88/08; H04W 76/14; H04W 72/0446; H04W 74/08; H04L 5/0007; H04L 1/1812; H04L 1/1861; H04L 5/0055
USPC .......................................... 370/329
See application file for complete search history.

(56) References Cited

U.S. PATENT DOCUMENTS

| | | | |
|---|---|---|---|
| 2017/0272200 A1* | 9/2017 | Dinan | H04L 1/001 |
| 2020/0029340 A1* | 1/2020 | He | H04W 72/10 |
| 2020/0228247 A1* | 7/2020 | Guo | H04W 52/243 |
| 2021/0092759 A1* | 3/2021 | Xiong | H04L 5/0048 |
| 2021/0168790 A1* | 6/2021 | Li | H04W 72/1278 |
| 2021/0194740 A1* | 6/2021 | Aldana | H04W 72/1215 |
| 2021/0219322 A1* | 7/2021 | Chin | H04L 1/1893 |

(Continued)

FOREIGN PATENT DOCUMENTS

DE    WO 2021/032509 A1 *    2/2021    ............... H04L 1/18

*Primary Examiner* — Mohammad S Anwar
*Assistant Examiner* — Sanjay K Dewan
(74) *Attorney, Agent, or Firm* — Patterson & Sheridan, L.L.P/Qualcomm Incorporated

(57) ABSTRACT

Certain aspects of the present disclosure provide a method for wireless communications by a transmitter UE. The method generally includes receiving, from a network entity, a downlink control information (DCI) allocating resources in an unlicensed frequency band for multiple physical sidelink shared channel (PSSCH) transmissions across multiple transmission time intervals (TTIs), performing a listen-before-talk (LBT) channel access procedure in the TTIs, and transmitting, to at least one receiver UE, one or more PSSCHs in one or more of the TTIs being indicated as passing the LBT channel access procedure based on the performance.

30 Claims, 12 Drawing Sheets

(56) References Cited

U.S. PATENT DOCUMENTS

| | | | |
|---|---|---|---|
| 2022/0140954 A1* | 5/2022 | Kim | H04L 1/1812 |
| | | | 370/329 |
| 2022/0141820 A1* | 5/2022 | Koutsimanis | H04L 5/0048 |
| | | | 370/329 |
| 2022/0167310 A1* | 5/2022 | Wang | H04L 1/1825 |
| 2022/0167408 A1* | 5/2022 | Lee | H04W 74/0808 |
| 2022/0183053 A1* | 6/2022 | Li | H04W 74/0808 |
| 2022/0201757 A1* | 6/2022 | Cruz | H04L 5/0053 |

* cited by examiner

MULTI-TTI SELECTIVE GRANT FOR SIDELINK COMMUNICATION IN UNLICENSED SPECTRUM

FIELD OF THE DISCLOSURE

Aspects of the present disclosure relate to wireless communications, and more particularly, to techniques for sidelink communications.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved acknowledgment feedback transmission for sidelink communications.

Certain aspects of the subject matter described in this disclosure can be implemented in a method for wireless communications by a transmitter user equipment (UE). The method generally includes receiving, from a network entity, a downlink control information (DCI) allocating resources in an unlicensed frequency band for multiple physical sidelink shared channel (PSSCH) transmissions across multiple transmission time intervals (TTIs), performing a listen-before-talk (LBT) channel access procedure in the TTIs; and transmitting, to at least one receiver UE, one or more PSSCHs in one or more of the TTIs being indicated as passing the LBT channel access procedure based on the performance.

Certain aspects of the subject matter described in this disclosure can be implemented in a method for wireless communications by a network entity. The method generally includes transmitting, to a transmitter user equipment (UE), a downlink control information (DCI) allocating resources in an unlicensed frequency band for multiple physical sidelink shared channel (PSSCH) transmissions across multiple transmission time intervals (TTIs) and receiving, from the transmitter UE, hybrid automatic repeat request (HARQ) feedback for the one or more PSSCH transmissions.

Certain aspects of the subject matter described in this disclosure can be implemented in a transmitter user equipment (UE). The transmitter UE generally includes a receiver configured to receive, from a network entity, a downlink control information (DCI) allocating resources in an unlicensed frequency band for multiple physical sidelink shared channel (PSSCH) transmissions across multiple transmission time intervals (TTIs), a processing system configured to perform a listen-before-talk (LBT) channel access procedure in the TTIs, and a transmitter configured to transmit, to at least one receiver UE, one or more PSSCHs in one or more of the TTIs being indicated as passing the LBT channel access procedure based on the performance.

Certain aspects of the subject matter described in this disclosure can be implemented in a network entity. The network entity generally includes a transmitter configured to transmit, to a transmitter user equipment (UE), a downlink control information (DCI) allocating resources in an unlicensed frequency band for multiple physical sidelink shared channel (PSSCH) transmissions across multiple transmission time intervals (TTIs), and a receiver configured to receive, from the transmitter UE, hybrid automatic repeat request (HARQ) feedback for the one or more PSSCH transmissions.

Aspects of the present disclosure provide UEs, network entities, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
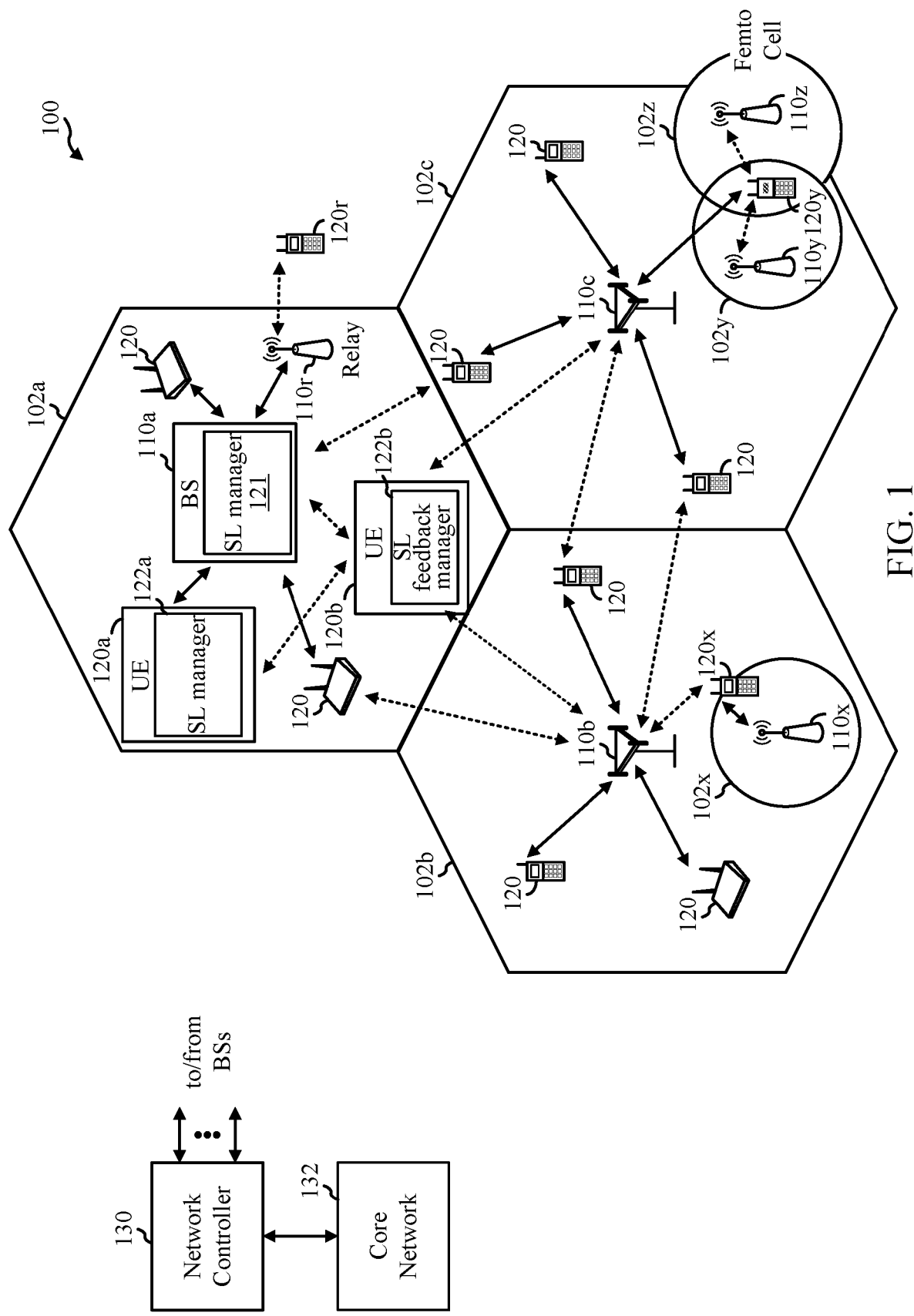
FIG. 1 is a block diagram conceptually illustrating an example telecommunications system, in accordance with certain aspects of the present disclosure.

Aspects of the present disclosure relate to wireless communications, and more particularly, to techniques for scheduling multiple sidelink transmissions in unlicensed spectrum.

In New Radio (NR), a user equipment (UE) may exchange sidelink data (e.g., user data and control signaling) with other UEs directly and without the help (e.g., relaying) of a base station. This type of sidelink communication is often called peer-to-peer (also referred to as device-to-device or D2D) communication. An example of peer-to-peer communication includes vehicle to everything (V2X) communication where a vehicle may communicate with another vehicle (V2V) or a different device, such as a base station, a traffic control system, or the like.

For sidelink communications, resources may be allocated differently in different modes. In a first mode, Mode 1 sidelink communication, the sidelink resources are often scheduled by a gNB. In a second mode, Mode 2 sidelink communication, the UE may autonomously select sidelink resources from a (pre)configured sidelink resource pool(s) based on the channel sensing mechanism. When the UE is in-coverage, a gNB may be configured to adopt Mode 1 or Mode 2. When the UE is out of coverage, only Mode 2 may be adopted.

When operating in Mode 1, in an unlicensed spectrum (NR-Unlicensed or NR-U) the gNB assigns orthogonal resources for transmitter UEs for their transmissions. In unlicensed spectrum, however, the transmitter UE still has to perform a listen before talk (LBT) procedure before transmitting. In the event of failure of the LBT procedure, the transmitter UE may need an additional DCI grant from gNB, resulting in additional control signal overhead and extra delay. Aspects of the present disclosure may help address this potential LBT issue for gNB based scheduling or NR-U sidelink transmissions in Mode 1.

The following description provides examples of scheduling multiple sidelink transmissions with a single grant, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 is a block diagram conceptually illustrating an example wireless communication network 100, in which certain aspects of the present disclosure may be practiced. For example, the wireless communication network 100 may include UEs 120a and 120b that include, among other modules/managers, sidelink (SL) managers 122a and 122b, respectively, configured to perform operations 600 of FIG. 6. Similarly, the wireless communication network 100 may include a BS 110a that includes, among other modules/managers, an SL manager 121, configured to perform operations 700 of FIG. 7.

Wireless communication network 100 may be, for example, an NR system (e.g., a 5G NR network). As shown in FIG. 1, the wireless communication network 100 may be in communication with a core network 132. The core network 132 may in communication with one or more base station (BSs) 110 and/or user equipments (UEs) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

Figure 2:
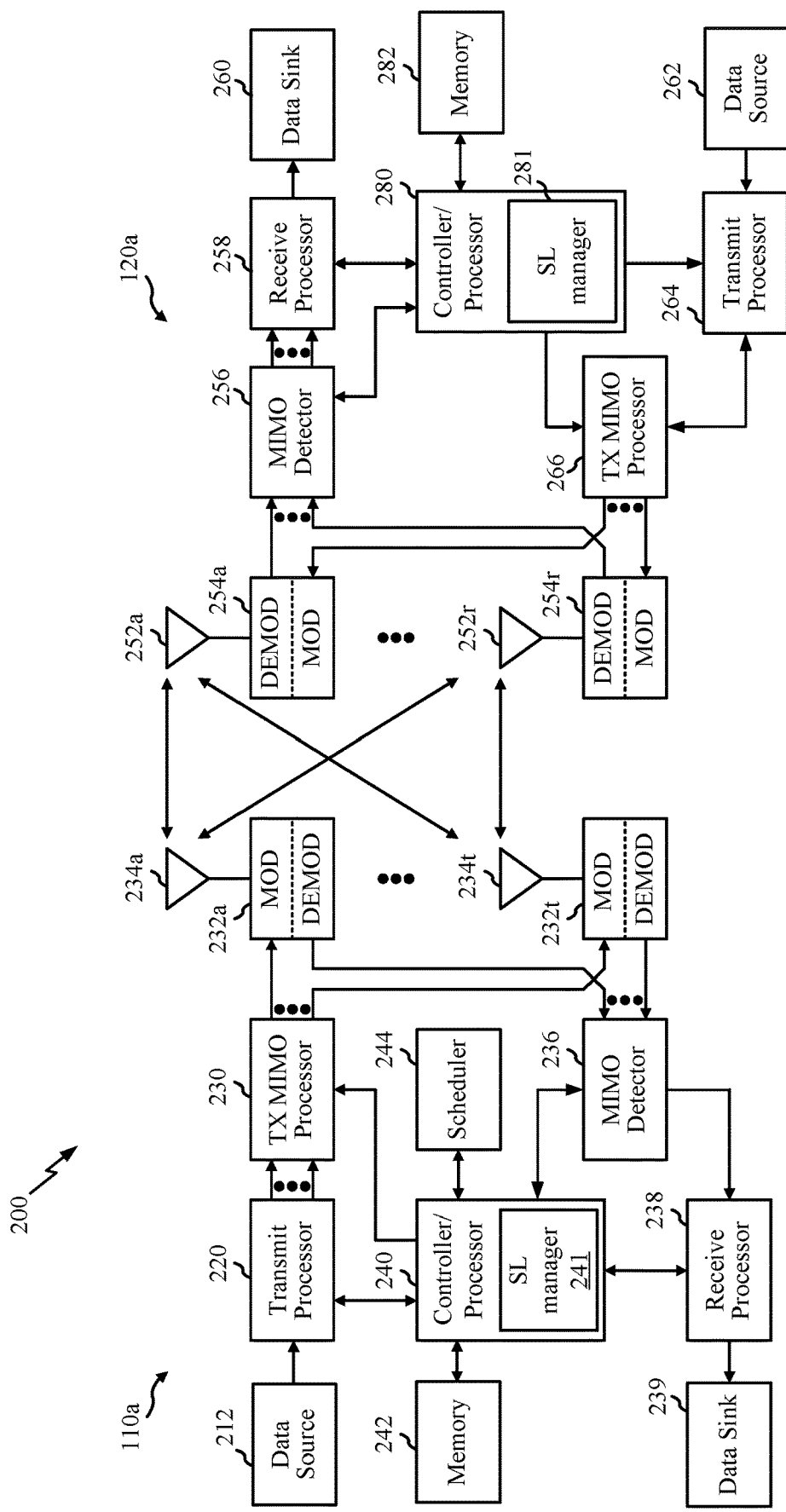
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120*a*. The receive processor 238 may provide the decoded data to a data sink 239 and the decoded control information to the controller/processor 240.

The memories 242 and 282 may store data and program codes for BS 110*a* and UE 120*a*, respectively. A scheduler 244 may schedule UEs for data transmission on the downlink and/or uplink.

Antennas 252, processors 266, 258, 264, and/or controller/processor 280 of the UE 120*a* and/or antennas 234, processors 220, 230, 238, and/or controller/processor 240 of the BS 110*a* may be used to perform the various techniques and methods described herein. For example, as shown in FIG. 2, the controller/processor 280 of the UE 120*a* may have an SL manager 281 configured to perform operations 600 of FIG. 7. Similarly, as shown in FIG. 2, the controller/processor 240 of the BS 110*a* may have an SL manager 241 configured to perform operations 600 of FIG. 7. Although shown at the controller/processor, other components of the UE 120*a* and BS 110*a* may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
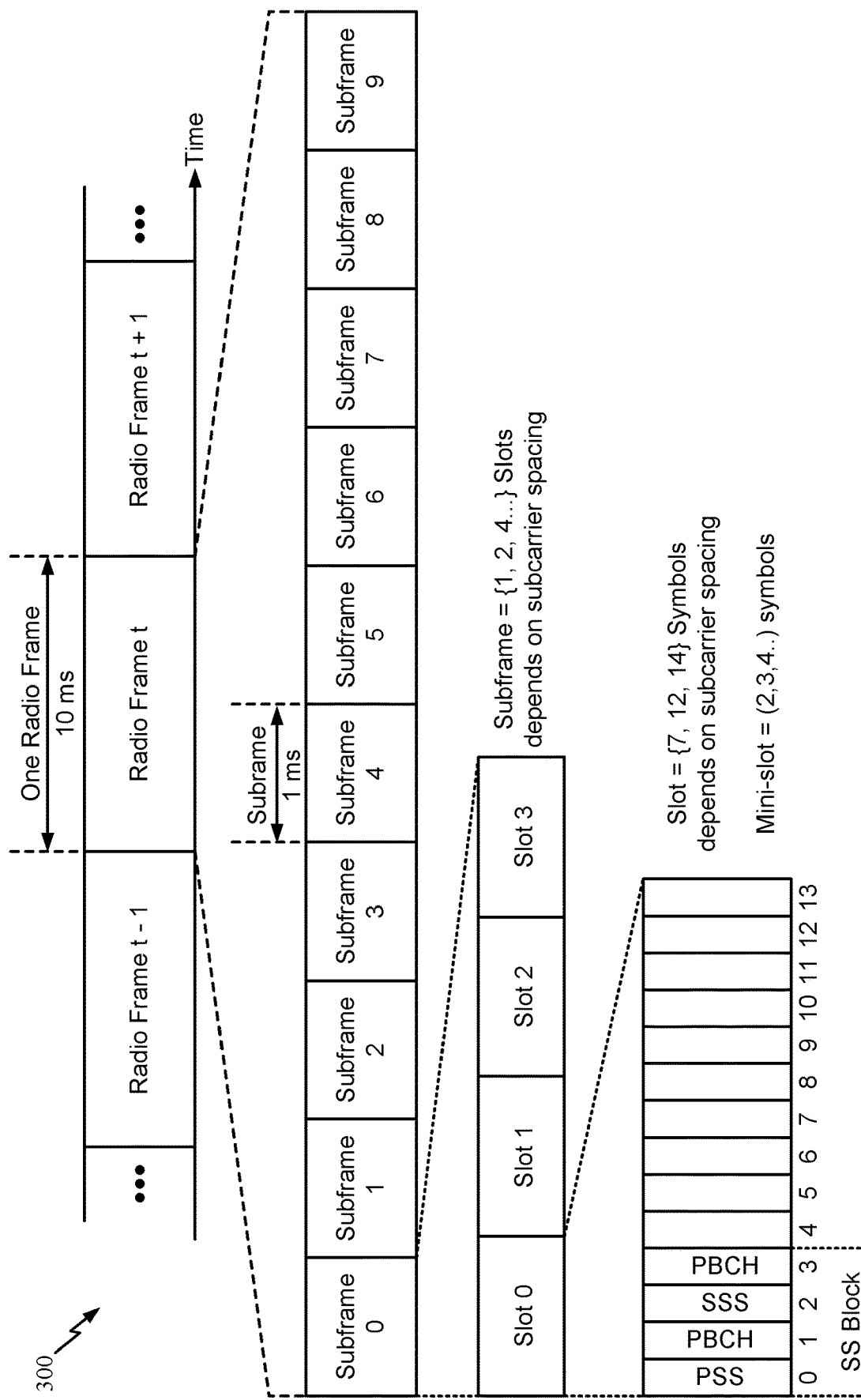
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, while the SS may provide the CP length and frame timing. The PSS and SSS may provide the cell identity. The PBCH carries some basic system information, such as downlink system bandwidth, timing information within radio frame, SS burst set periodicity, system frame number, etc.

The SSBs may be organized into SS bursts to support beam sweeping. Further system information, such as remaining minimum system information (RMSI), system information blocks (SIBs), other system information (OSI) may be transmitted on a physical downlink shared channel (PDSCH) in certain subframes. The SSB may be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets may be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120*a*, as shown in FIG. 1) to another subordinate entity (e.g., UE122*a* UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling, such as sidelink resource configurations and other parameters used for data transmissions, and the PSSCH may carry the data transmissions. The PSFCH may carry sidelink feedbacks, such as distance-based and/or non-distance-based HARQ feedbacks related to data transmissions between two or more UEs that are in direct communication with each other.

Figure 4:
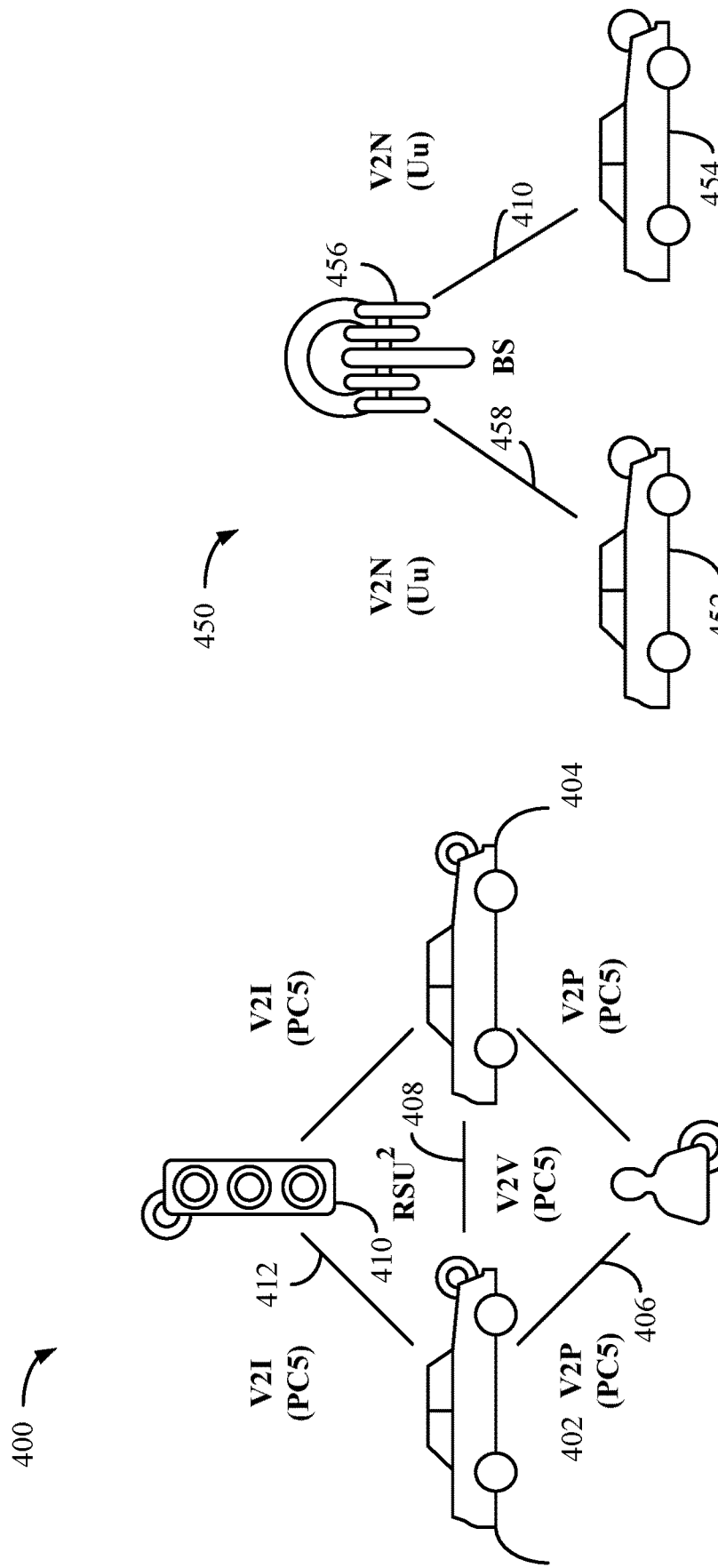
FIG. 4A and FIG. 4B illustrate diagrammatic representations of example vehicle to everything (V2X) systems, in accordance with certain aspects of the present disclosure.

FIG. 4A and FIG. 4B show diagrammatic representations of example V2X systems, in accordance with some aspects of the present disclosure. For example, the vehicles shown in FIG. 4A and FIG. 4B may perform data transmissions via sidelink channels and may receive sidelink feedbacks regarding those data transmissions, as described herein.

The V2X systems that are shown in FIG. 4A and FIG. 4B provide two complementary transmission modes. A first transmission mode, shown by way of example in FIG. 4A, may involve direct communications (may also be referred to as sidelink communications) between participants in proximity to one another in a local area. Sidelink transmissions by the UEs (e.g., Vehicles 402 and 404, or traffic light 410) may implemented over a PC5 interface (e.g., a wireless communication interface between a first UE and a second UE). A second transmission mode, shown by way of example in FIG. 4B, may involve network communications through a network, which may be implemented over a Uu interface (e.g., a wireless communication interface between a radio access network (RAN) and a UE).

Referring to FIG. 4A, a V2X system 400 (e.g., vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (e.g., with a mobile phone of the individual) through a PC5 interface. Communications between the vehicles 402 and 404 may also occur through a PC5 interface 408. In a like manner, communication may occur from a vehicle 402 to other highway components (e.g., highway component 410), such as a traffic signal or sign (V2I) through a PC5 interface 412. With respect to each communication link illustrated in FIG. 4A, two-way communication may take place between elements, therefore each element may be a transmitter and a receiver of information.

The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed and/or unlicensed spectrum, thus any vehicle with an equipped system may access a common frequency and share information. Such harmonized/common spectrum operations may allow for safe and reliable operations.

FIG. 4B shows a V2X system 450 for communication between a vehicle 452 and a vehicle 454 through a network entity 456. These network communications may occur through discrete nodes, such as a BS (e.g., the B S 110a shown in FIG. 1), that sends and receives information to and from (or relays information between) vehicles 452, 454. The network communications through vehicle to network (V2N) links 458 and 410 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Example Mode 1 Multi-TTI Grant for Sidelink Communication in Unlicensed Spectrum Aspects of the present disclosure relate to wireless communications, and more particularly, to techniques for scheduling multiple sidelink transmissions in unlicensed spectrum.

Current cellular V2X communication designs target deployments in licensed spectrum. Such designs typically either share spectrum in a licensed cellular band or dedicated ITS (intelligent transportation system) spectrum. In the licensed cellular spectrum, V2X systems share uplink spectrum in a cellular network. In dedicated ITS spectrum there are spectrums around 5.9 GHz allocated for V2X in some regions.

The dedicated spectrum is not guaranteed in some regions due to scarcity of spectrum. For example, in some areas/countries, there is dedicated spectrum allocated for LTE V2X (specified in LTE Release-14 and Release-15), but no spectrum available for NR V2X (specified in NR Release-16 targeting advanced V2X use cases like autonomous driving).

As a result, it is likely that cellular V2X communications will be deployed in unlicensed spectrum, given that it might be the only option in some regions. However, unlicensed spectrum may be shared by other technologies like Wi-Fi. For this reason, use of unlicensed spectrums is typically subject to various regulatory requirements depending on the region. One of the requirements is listen before talk (LBT): which mandates that a device only transmits (talk) in an unlicensed channel if the channel is sensed (by listening) to be free.

LBT is a form of a clean channel assessment (CCA) procedure that typically involves measuring energy or power in the channel for a certain duration of time. Exactly when devices transmit may depend on a particular category of LBT. For a category 2 (CAT 2) LBT, the device transmits if the CCA indicates the channel is free; e.g., Type 2 channel access procedures as specified in 3GPP. For a category 4 (CAT 4) LBT, the device performs random back-off within a contention window (extended CCA) if CCA indicates the channel is free, and transmits only when channel is still free during the back-off period; e.g., Type 1 channel access procedures as specified in 3GPP.

Figure 5:
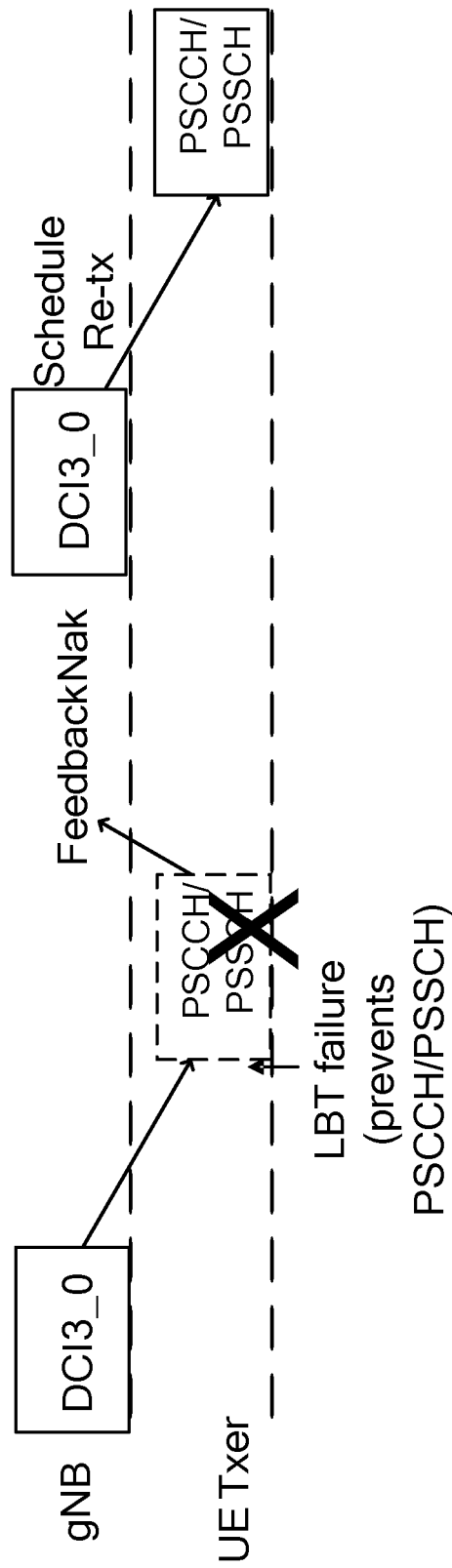
FIG. 5 illustrates an example listen before talk (LBT) scenario for sidelink communications.

As noted above, when operating in Mode 1 with gNB allocating resources in an unlicensed spectrum is that the transmitter UE still has to perform an LBT procedure before transmitting. This scenario is illustrated in FIG. 5, in which a gNB sends a grant to a transmitter UE for a single SL transmission, via a DCI. The transmitter UE performs an LBT to ensure the channel is free before sending the SL transmission. As illustrated, in the event of failure of the LBT procedure, it may send a negative acknowledgment (NAK) feedback to the gNB, indicating the transmitter UE may need an additional DCI grant from gNB, thus resulting in additional control signal overhead and extra delay.

Aspects of the present disclosure may help address this potential LBT issue for gNB based scheduling or NR-U sidelink transmissions in Mode 1. For example, the techniques proposed herein may enable multi-TTI scheduling in Mode 1 for a SL Transmitter UE to transmit multiple TB s, via a single downlink control information (DCI, such as DCI format 3_0). This may allow a transmitter UE to still transmit, even in the event an LBT procedure for one of the scheduled transmissions fails, which may help reduce signaling overhead and reduce delay.

Figure 6:
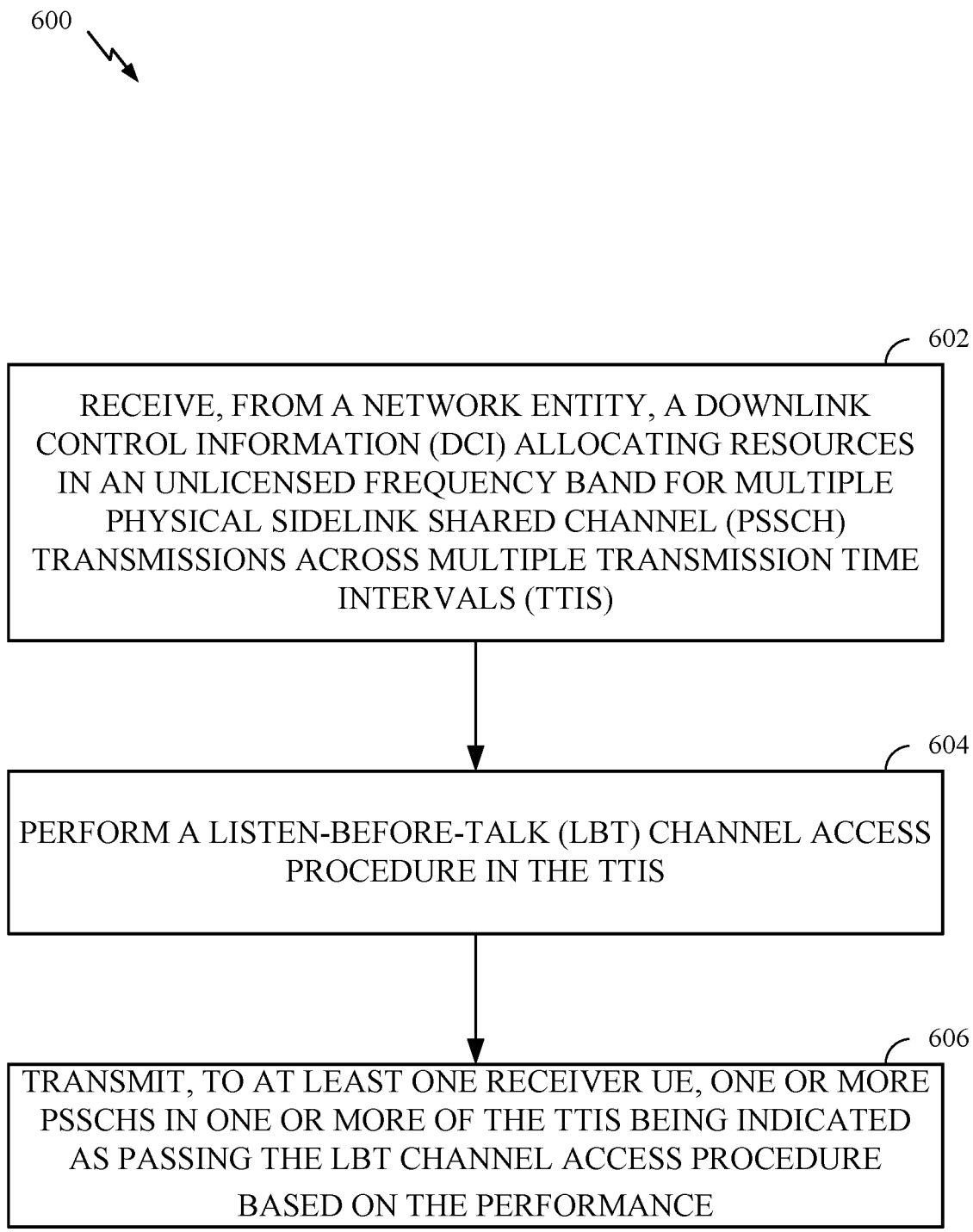
FIG. 6 illustrates example operations for wireless communications by a transmitter user equipment (UE), in accordance with certain aspects of the present disclosure.
Figure 7:
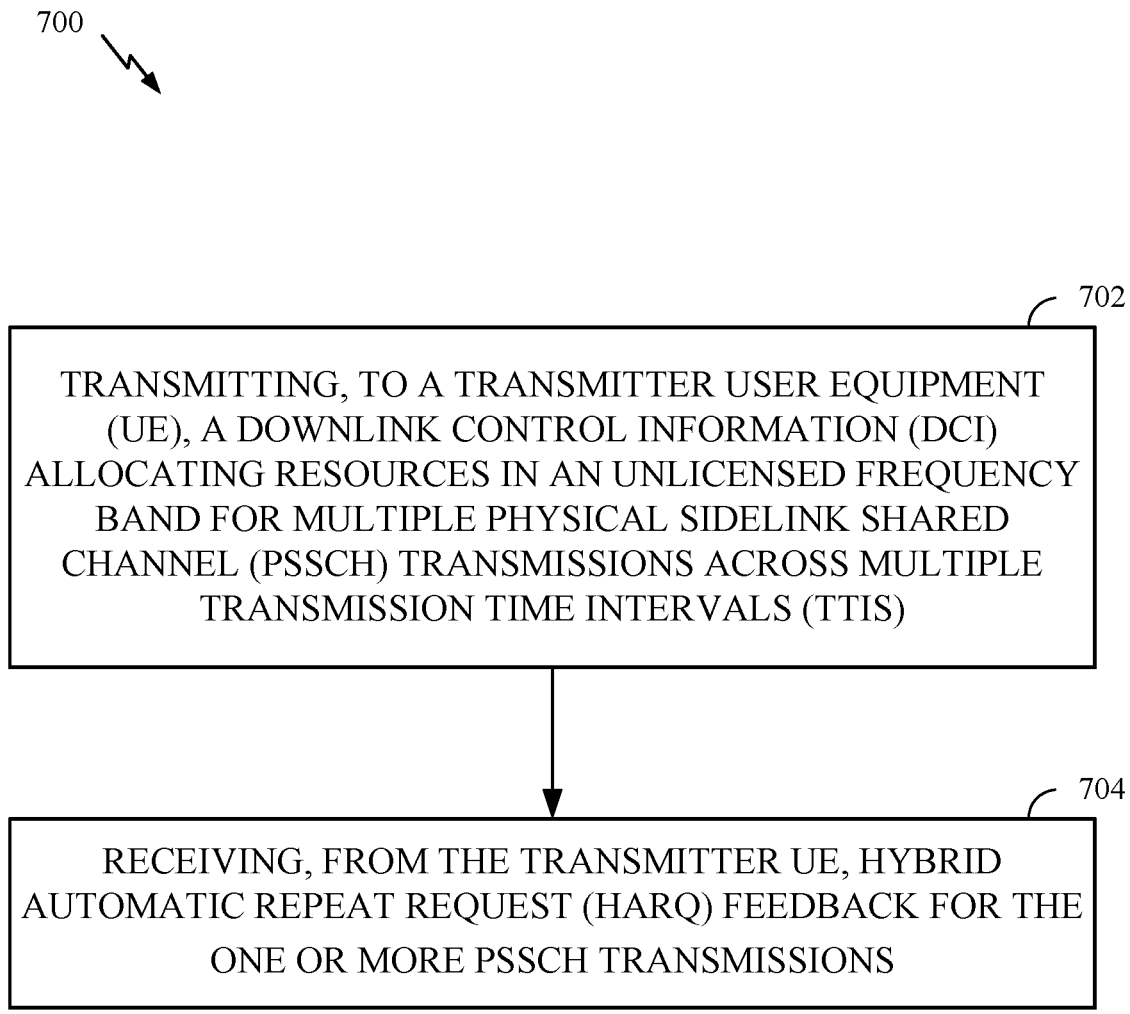
FIG. 7 illustrates example operations for wireless communications by a receiver UE, in accordance with certain aspects of the present disclosure.

FIGS. 6 and 7 illustrate operations 600 and 700 for processing multi-TTI SL transmissions, from a Tx UE and network entity (e.g., gNB) perspective, respectively. These operations may be understood with reference to the example timeline shown in FIG. 8.

FIG. 6 illustrates example operations 600 for wireless communications by a transmitter UE, in accordance with certain aspects of the present disclosure. Operations 600 may be performed, for example, by a Tx UE (e.g., such as UE 120a in the wireless communication network 100, as shown in FIG. 1) to transmit sidelink data and signal a receiver UE whether resources are available for acknowledging the data.

Figure 8:
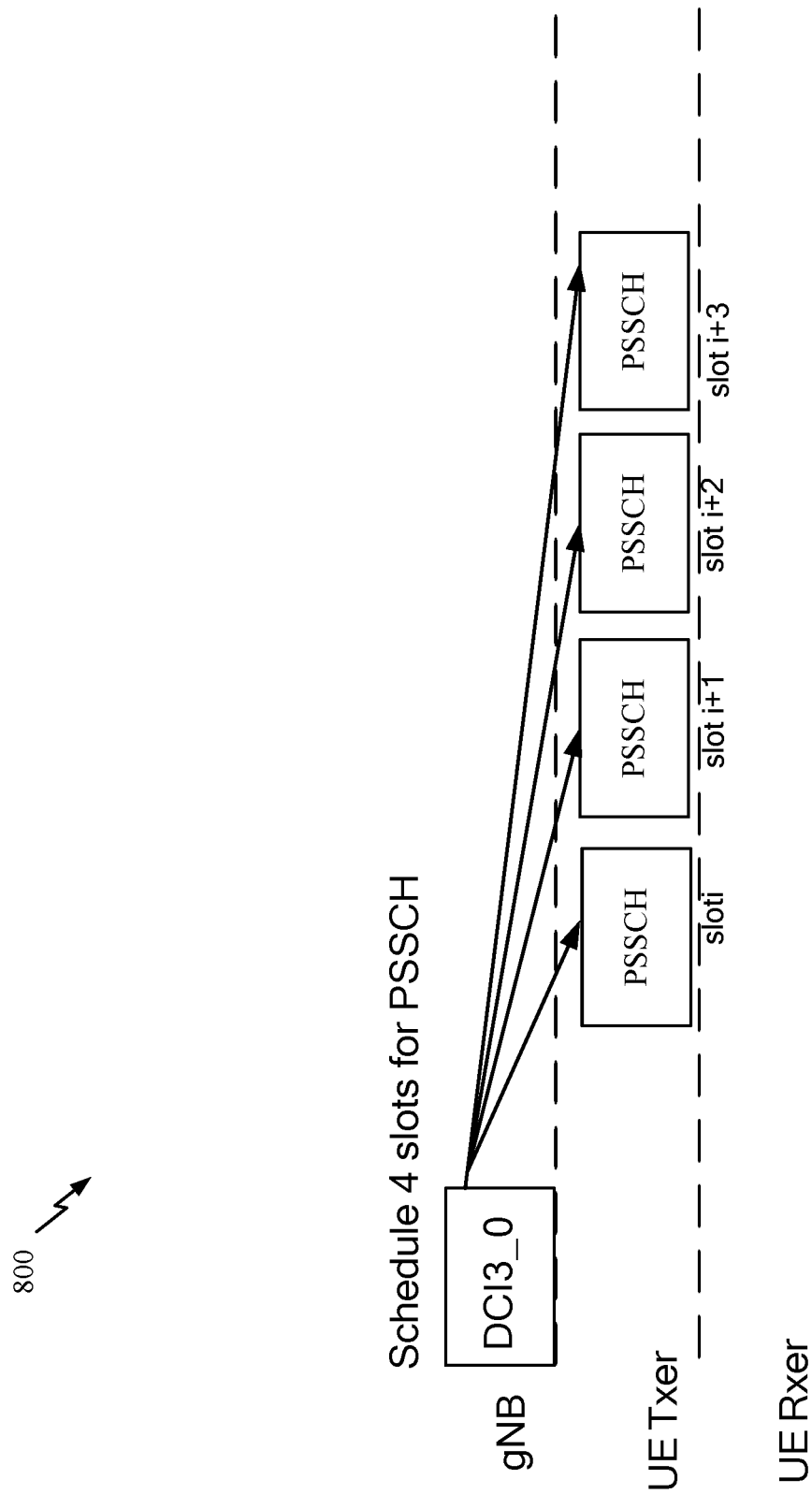
FIG. 8 illustrates an example timeline for a grant scheduling multiple sidelink transmissions, in accordance with certain aspects of the present disclosure.

Operations 600 begin, at 602, by receiving, from a network entity, a downlink control information (DCI) allocating resources in an unlicensed frequency band for multiple physical sidelink shared channel (PSSCH) transmissions across multiple transmission time intervals (TTIs). As shown in FIG. 8, the DCI may be a DCI format DCI3_0 that indicates time and frequency resources for multiple sidelink transmissions. In the illustrated example, resources are allocated for 4 PSSCH transmissions in consecutive slots (slots i through i+3).

At 604, the transmitter UE performs a listen-before-talk (LBT) channel access procedure in the TTIs. At 606, the transmitter UE transmits, to at least one receiver UE, one or more PSSCHs in one or more of the TTIs being indicated as passing the LBT channel access procedure based on the performance.

In this manner, a gNB may configure an SL transmitter UE with a preconfigured number of SL (PSCCH/PSSCH) repetitions so that the SL transmitter UE has multiple opportunities to clear the LBT before requesting a retransmission from gNB.

As shown in FIG. 8, in some cases, a single DCI (DCI3_0) may include a multi-TTI grant for PSCCH/PSSCH in continuous slots within a pool (TX pool) of resources available for sidelink transmissions. This DCI may convey a single grant and indicate time domain resource allocation (TDRA) for multiple TBs.

In one case, the DCI may include a TDRA field that indicates time domain resources for multiple PSCCH/PSSCH within the TX pool. In such a case, a new TDRA table may be defined that indicates resources across several continuous slots in TX pool (as may be done with multi-TTI grants for Uu physical uplink shared channel (PUSCH) transmissions).

In another case, the DCI may use a time resource assignment in a field (e.g., an SCI-1A field used for Mode 1 resource allocation) to schedule resources in multiple slots. In such cases, a conventional time resource assignment field (e.g., of 9 bits) could allow reservation up to 3 slots within 32 continuous slots. In some cases, more efficient signaling (with less bits) could be possible if only continuous slots were signaled (e.g., with support to schedule up to 32 continuous slots within 32 slots by indicating a starting location and number of slots).

In some cases, a transmitter UE may need to determine hybrid automatic repeat request (HARQ) IDs for each sidelink transmission. In some cases, an incremental approach for HARQ IDs may be used for the associated PSCCH/PSSCH. In other words, the scheduling DCI (e.g., DCI3_0) may only indicates the first HARQ ID associated with the first slot and the HARQ process ID may then be incremented (by 1) for subsequent slots in the scheduled order (with modulo operation as needed if the number of slots exceeds a number of HARQ process IDs).

In other cases, the SL transmitter UE could keep its own mapping of the HARQ ID indicated in the scheduling DCI (e.g., DCI3_0) with a PC-5 HARQ ID and destination ID.

In some cases, the transmitter UE may use multiple new data indicator (NDI) bits for the multiple SL transmissions. For example, each PSSCH may have a corresponding NDI bit to indicate if that transmission is a new transmission or a retransmission.

In some cases, the multiple SL transmissions may share a common resource pool index, and the lowest subchannel index of initial transmission. In such cases, all of the PSSCHs may take a same starting subchannels for initial transmission.

In some cases, a common frequency resource assignment (e.g., SCI format 1-A field) may be used. In such cases, all of the PSSCHs may have the same frequency allocation (e.g., starting subchannel and # of subchannels) for both initial transmissions and retransmissions.

One consideration for multi-TTI SL grants proposed herein, is how to reserve future slots for retransmission (potentially) of multiple PSSCHs. In one example, all the PSSCHs may share the same time resource assignment field and the retransmission time domain resource mapping may be based on one or more defined rules.

Figure 9A:
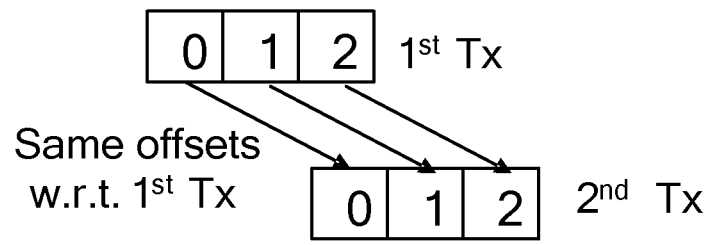
FIG. 9A illustrates an example timeline for scheduling multiple sidelink retransmissions, in accordance with certain aspects of the present disclosure.

For example, as illustrated in FIG. 9A, the time domain resource assignment for future slots reserved for retransmission may be determined with respect to the associated PSSCH initial transmission. In other words, all retransmissions of PSSCHs may share the same timing offset with respect to the corresponding initial transmission. For example, the DCI may schedule a first burst of PSSCH for initial transmissions and a second burst of PSSCH for retransmissions. If the first PSSCH of the second burst is offset from the first PSSCH of the first burst by x slots, each remaining (retransmission) PSSCH of the second burst will also be offset by a corresponding (initial) PSSCH of the first burst by x slots. It may be noted that, for this approach, the gNB may need to pick different subchannels for retransmission, if the bursts of transmission overlap in time.

Sidelink Assignment Indexes (SAIs) refer to a mechanism that helps track a number of scheduled sidelink transmissions (PSSCHs). An SAI counter may facilitate detecting a missing DCI detection. This may allow a transmitter UE to know how may transmissions a scheduling gNB is expecting, so it may feedback an appropriate number of bits. In some cases, this may mean the sidelink transmitter UE performs padding (adding additional bits to account for missing DCI) for HARQ feedback (e.g., if using an SL type-2 HARQ codebook). For example, the transmitter UE may have to pad PUCCH carrying the feedback, so the payload size is as expected by the gNB. The number of bits may be defined based on the PDCCH monitoring instance.

Figure 9B:
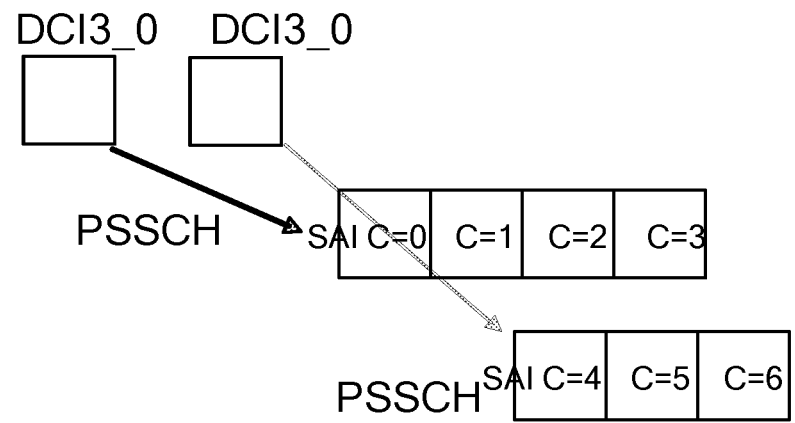
FIG. 9B illustrates an example timeline for sidelink assignment indexes for multiple sidelink transmissions and retransmissions, in accordance with certain aspects of the present disclosure.

Aspects of the present disclosure may also allow for SAI values when supporting multi-TTI SL grants. For example, as illustrated in FIG. 9B, a DCI for multi-TTI SL grants (e.g., DCI 3_x) may indicate the SAI value for the first PSSCH, and the following PSSCHs may assume incremental SAI values based on one or more predefined rules. In this manner, there may be no need for an explicit SAI field for the later PSSCHs (after the initial PSSCH) and the SAI values may be derived based on the rules. For example, the SAI value of the n-th PSSCH after the $1^{st}$ scheduled PSSCH may assume to be $SAI_{1st}+(n-1)$.

In this case, the next multi-TTI SL DCI could increase the SAI based on the last SAI associated with the last PSSCH in the previous (multi-TTI) DCI grant. For example, referring again to FIG. 9B, if the first DCI indicates SAI=0 for the first PSSCH in a burst of 3 PSSCH transmissions, the next DCI may indicate SAI=3 for the first PSSCH in a subsequent burst of 3 PSSCH transmissions.

It may also be assumed that there are virtual PDCCH monitoring instances associated with PSSCHs after the $1^{st}$ PSSCH in each burst. The virtual PDCCH monitoring instance may follow the first actual PDCCH carrying DCI3_x in the following contiguous slots.

Aspects of the present disclosure may also provide efficient signaling mechanisms for providing feedback (e.g., HARQ feedback) for SL transmissions scheduled with a multi-TTI grant. As noted above, PSFCH may be used to provide a transmitter UE feedback for its SL transmission.

In some systems (e.g., Rel. 16), using SL type-2 HARQ codebook, up to 1 PSFCH reception associated with one PDCCH monitoring occasion may be assumed, In this case, a PDCCH monitoring occasion may contribute up to one bit in a codebook.

For multi-TTI SL grants, however, a PDCCH could schedule multiple PSSCHs with different TBs and could receive multiple HARQ bits from multiple PSFCHs. As a result, there could be multiple PSFCHs associated with a single multi-TTI grant. Aspects of the present disclosure provide techniques for providing feedback to a scheduling gNB in such cases, in a manner that may help avoid or reduce delays.

For example, for type-2 codebook based feedback, all HARQ bits from the multiple PFSCH receptions associated with a multi-TTI grant may be mapped to the same HARQ codebook for PUCCH/PUSCH.

Figure 10:
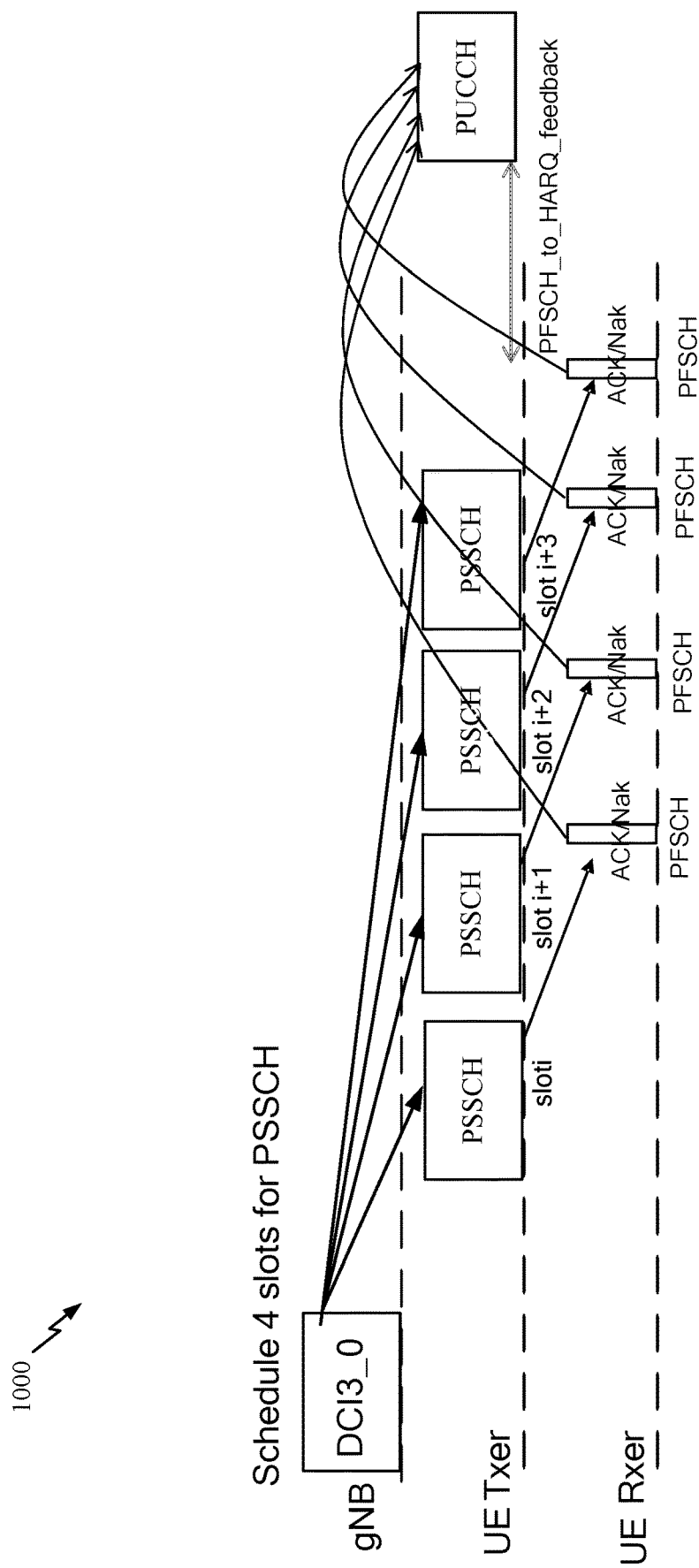
FIG. 10 illustrates an example timeline for acknowledgment feedback for a grant scheduling multiple sidelink transmissions, in accordance with certain aspects of the present disclosure.

An example of this scenario is illustrated in FIG. 10, which shows a single PUCCH carrying ACK/NAK for multiple PSSCHs scheduled by a multi-TTI grant. As with the example shown in FIG. 5, a multi-TTI grant schedules 4 PSSCH transmission in consecutive slots. As illustrated, ACK/NAK bits from the multiple (4) PSFCH receptions associated the multi-TTI grant are grouped together in a single PUCCH carrying HARQ feedback to the gNB. As indicated, a PSFCH to HARQ feedback timing delay may be with respect to the last PFSCH reception (or the n-th reception).

A benefit of this approach is that instead of carrying multiple delays of PUCCH to PFSCH, a single delay should be sufficient, as there is a single PUCCH carrying the grouped HARQ bits.

In the case of HARQ feedback for SL transmissions scheduled by a multi-TTI grant, a gNB may not be certain whether a NACK is due to a failed SL transmission or a failed LBT (preventing the SL transmission). In other words, if an SL transmitter UE fails an LBT at a slot, a corresponding PSSCH will not be transmitted and no corresponding ACK/NAK will be received in an associated PSFCH.

According to certain aspects, if an SL transmitter UE fails the LBT in one of the slots in a multi-TTI grant, the SL transmitter UE may send a NAK in the corresponding HARQ bit (for that scheduled SL transmission that did not happen) in type-2 HARQ codebook. In some cases, this could help address the type-2 HARQ codebook size uncertainty due to the LBT failure.

Figure 11:
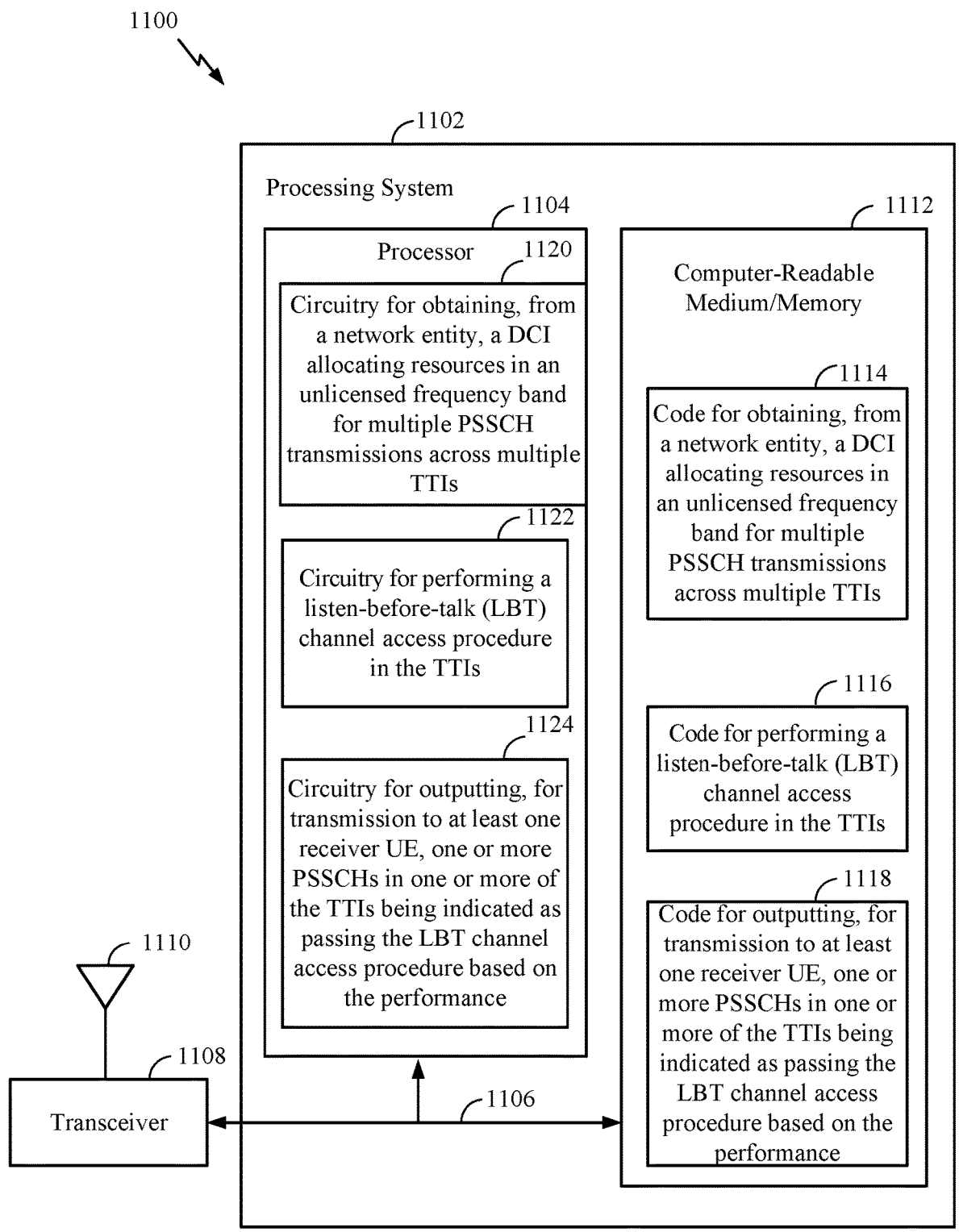
FIG. 11 illustrates a communications device that may include various components configured to perform operations for techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 6. The communications device 1100 may include a processing system 1102 coupled to a transceiver 1108 (e.g., a transmitter and/or a receiver). The transceiver 1108 may be configured to transmit and receive signals for the communications device 1100 via an antenna 1110, such as the various signals as described herein. The processing system 1102 may be configured to perform processing functions for the communication device 1100, including processing signals received and/or to be transmitted by the communications device 1100.

The processing system 1102 may include a processor 1104 coupled to a computer-readable medium/memory 1112 via a bus 1106. In certain aspects, the computer-readable medium/memory 1112 may be configured to store instructions (e.g., computer-executable code) that when executed by the processor 1104, cause the processor 1104 to perform the operations illustrated in FIG. 6, or other operations for performing the various techniques discussed herein. In certain aspects, computer-readable medium/memory 1112 may store code 1114 for obtaining, from a network entity, a downlink control information (DCI) allocating resources in an unlicensed frequency band for multiple physical sidelink shared channel (PSSCH) transmissions across multiple transmission time intervals (TTIs); code 1116 for performing a listen-before-talk (LBT) channel access procedure in the TTIs; and/or code 1118 for outputting, for transmission to at least one receiver UE, one or more PSSCHs in one or more of the TTIs being indicated as passing the LBT channel access procedure based on the performance.

In certain aspects, the processor 1104 may have circuitry configured to implement the code stored in the computer-readable medium/memory 1112. The processor 1104 may include circuitry 1120 for obtaining, from a network entity, a downlink control information (DCI) allocating resources in an unlicensed frequency band for multiple physical sidelink shared channel (PSSCH) transmissions across multiple transmission time intervals (TTIs); circuitry 1122 for performing a listen-before-talk (LBT) channel access procedure in the TTIs; and/or circuitry 1124 for outputting, for transmission to at least one receiver UE, one or more PSSCHs in one or more of the TTIs being indicated as passing the LBT channel access procedure based on the performance.

Figure 12:
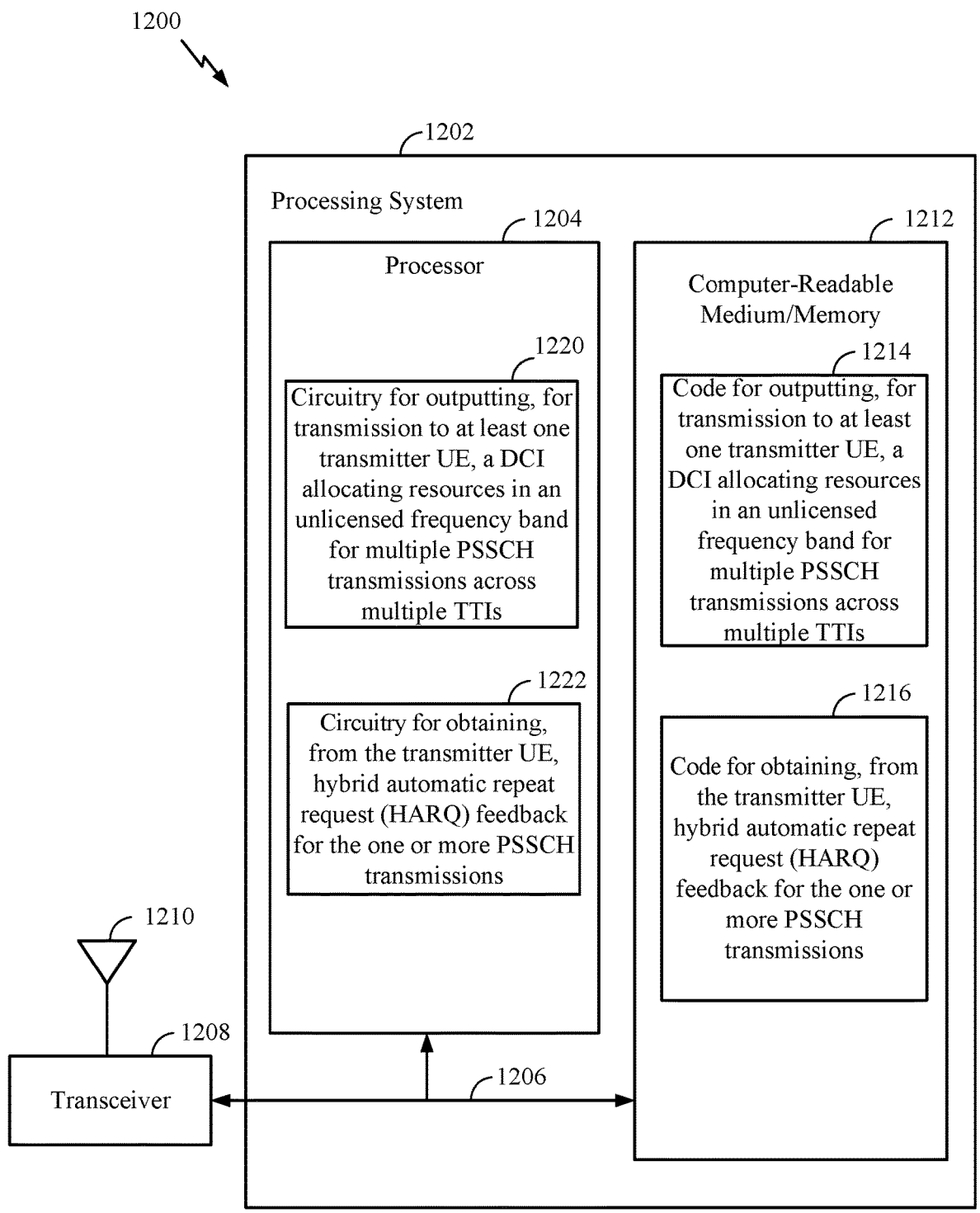
FIG. 12 illustrates a communications device that may include various components configured to perform operations for techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 7. The communications device 1200 may include a processing system 1202 coupled to a transceiver 1208 (e.g., a transmitter and/or a receiver). The transceiver 1208 may be configured to transmit and receive signals for the communications device 1200 via an antenna 1210, such as the various signals as described herein. The processing system 1202 may be configured to perform processing functions for the communication device 1200, including processing signals received and/or to be transmitted by the communications device 1200.

The processing system 1202 may include a processor 1204 coupled to a computer-readable medium/memory 1212 via a bus 1206. In certain aspects, the computer-readable medium/memory 1212 may be configured to store instructions (e.g., computer-executable code) that when executed by the processor 1204, cause the processor 1204 to perform the operations illustrated in FIG. 7, or other operations for performing the various techniques discussed herein. In certain aspects, computer-readable medium/memory 1212 may store code 1214 for outputting, for transmission to a transmitter user equipment (UE), a downlink control information (DCI) allocating resources in an unlicensed frequency band for multiple physical sidelink shared channel (PSSCH) transmissions across multiple transmission time intervals (TTIs); and/or code 1216 for obtaining, from the transmitter UE, hybrid automatic repeat request (HARQ) feedback for the one or more PSSCH transmissions.

In certain aspects, the processor 1204 may have circuitry configured to implement the code stored in the computer-readable medium/memory 1212. The processor 1204 may include circuitry 1220 for outputting, for transmission to a transmitter user equipment (UE), a downlink control information (DCI) allocating resources in an unlicensed frequency band for multiple physical sidelink shared channel (PSSCH) transmissions across multiple transmission time intervals (TTIs); and/or circuitry 1222 for obtaining, from the transmitter UE, hybrid automatic repeat request (HARQ) feedback for the one or more PSSCH transmissions.

Example Aspects

In addition to the various aspects described above, aspects of specific combinations are within the scope of the disclosure, some of which are detailed below:

Aspect 1: A method for wireless communications by a transmitter user equipment (UE), comprising: receiving, from a network entity, a downlink control information (DCI) allocating resources in an unlicensed frequency band for multiple physical sidelink shared channel (PSSCH) transmissions across multiple transmission time intervals (TTIs); performing a listen-before-talk (LBT) channel access procedure in the TTIs; and transmitting, to at least one receiver UE, one or more PSSCHs in one or more of the TTIs being indicated as passing the LBT channel access procedure based on the performance.

Aspect 2: The method of Aspect 1, wherein the multiple TTIs comprise continuous slots.

Aspect 3: The method of Aspect 2, wherein the continuous slots are indicated by a time domain resource allocation (TDRA) table or a time resource assignment in a sidelink control information (SCI) field of the DCI.

Aspect 4: The method of any of Aspects 1-3, wherein: the DCI indicates a hybrid automatic repeat request (HARQ) identifier (HARQ ID); and the method further comprises deriving a HARQ ID for each of the one or more PSSCHs based on the HARQ ID indicated in the DCI.

Aspect 5: The method of any of Aspects 1-4, wherein: each of the one or more PSSCHs is scheduled with sidelink control information (SCI) associated with a new data indicator (NDI) bit to indicate whether a corresponding transport block (TB) contains new data or is a retransmission.

Aspect 6: The method of any of Aspects 1-5, wherein: an initial transmission of each of the one or more PSSCHs is transmitted on a same starting subchannel.

Aspect 7: The method of any of Aspects 1-6, wherein: each retransmission of the one or more PSSCHs has a same frequency allocation as an initial transmission of the same PSSCH.

Aspect 8: The method of any of Aspects 1-7, wherein: each of the one or more PSSCH transmissions shares a same time resource assignment field; and the method further comprises determining time domain resources for a retransmission of the one or more PSSCHs based on at least one rule.

Aspect 9: The method of Aspect 8, wherein: the DCI allocates time domain resources for a first burst of PSSCHs for initial transmission and indicates a time domain offset between a first PSSCH of the first burst and a first PSSCH of a first burst of a second burst of PSSCHs for retransmission; and the at least one rule indicates that each PSSCH in the second burst is offset by the same time domain offset from a corresponding PSSCH in the first burst.

Aspect 10: The method of any of Aspects 1-9, wherein: the DCI indicates a sidelink assignment index (SAI) value for a first PSSCH of the one or more PSSCHs; and the method further comprises deriving a SAI value for each of the remaining one or more PSSCHs based on the SAI value indicated in the DCI.

Aspect 11: The method of any of Aspects 1-10, further comprising: receiving, from the receiver UE, one or more physical sidelink feedback channels (PFSCHs) associated with the one or more PSSCH transmissions; mapping hybrid automatic repeat request (HARQ) bits in the one or more PFSCHs to a HARQ codebook used for providing physical uplink shared channel (PUSCH) physical uplink control channel (PUCCH) HARQ feedback; and transmitting, to the network entity, a feedback for the one or more PSSCH transmissions based on the mapping.

Aspect 12: The method of Aspect 11, wherein: if one of the TTIs fails the LBT channel access procedure based on the performance, the UE sends a negative acknowledgment (NAK) for the corresponding HARQ bit being mapped to the HARQ codebook.

Aspect 13: A method for wireless communications by a network entity, comprising: transmitting, to a transmitter user equipment (UE), a downlink control information (DCI) allocating resources in an unlicensed frequency band for multiple physical sidelink shared channel (PSSCH) transmissions across multiple transmission time intervals (TTIs); and receiving, from the transmitter UE, hybrid automatic repeat request (HARQ) feedback for the one or more PSSCH transmissions.

Aspect 14: The method of Aspect 13, wherein the multiple TTIs comprise continuous slots.

Aspect 15: The method of Aspect 14, wherein the continuous slots are indicated by a time domain resource allocation (TDRA) table or a time resource assignment in a sidelink control information (SCI) field of the DCI.

Aspect 16: The method of any one of Aspects 13-15, wherein: the DCI indicates a hybrid automatic repeat request (HARQ) identifier (HARQ ID) for use by the transmitter UE in deriving a HARQ ID for each of the one or more PSSCHs based on the HARQ ID indicated in the DCI.

Aspect 17: The method of any one of Aspects 13-16, wherein: each of the one or more PSSCHs is scheduled with sidelink control information (SCI) associated with a new data indicator (NDI) bit to indicate whether a corresponding transport block (TB) contains new data or is a retransmission.

Aspect 18: The method of any one of Aspects 13-17, wherein: an initial transmission of each of the one or more PSSCHs is scheduled for transmission on a same starting subchannel.

Aspect 19: The method of any one of Aspects 13-18, wherein: each retransmission of the one or more PSSCHs is scheduled for transmission with a same frequency allocation as an initial transmission of the same PSSCH.

Aspect 20: The method of any one of Aspects 13-19, wherein: each of the one or more PSSCH transmissions shares a same time resource assignment field for use by the transmitter UE in determining time domain resources for a retransmission of the one or more PSSCHs based on at least one rule.

Aspect 21: The method of Aspect 20, wherein: the DCI allocates time domain resources for a first burst of PSSCHs for initial transmission and indicates a time domain offset between a first PSSCH of the first burst and a first PSSCH of a first burst of a second burst of PSSCHs for retransmission; and the at least one rule indicates that each PSSCH in the second burst is offset by the same time domain offset from a corresponding PSSCH in the first burst.

Aspect 22: The method of any one of Aspects 13-21, wherein: the DCI indicates a sidelink assignment index (SAI) value for a first PSSCH of the one or more PSSCHs for use by the transmitter UE in deriving a SAI value for each of the remaining one or more PSSCHs based on the SAI value indicated in the DCI.

Aspect 23: A transmitter user equipment, comprising means for performing the operations of one or more of Aspects 1-12.

Aspect 24: A transmitter user equipment, comprising a transceiver and a processing system including at least one processor configured to perform the operations of one or more of Aspects 1-12.

Aspect 25: An apparatus for wireless communications by a transmitter user equipment (UE), comprising: an interface configured to obtain, from a network entity, a downlink control information (DCI) allocating resources in an unlicensed frequency band for multiple physical sidelink shared channel (PSSCH) transmissions across multiple transmission time intervals (TTIs); and a processing system configured to perform a listen-before-talk (LBT) channel access procedure in the TTIs, wherein the interface is further configured to output, for transmission to at least one receiver UE, one or more PSSCHs in one or more of the TTIs being indicated as passing the LBT channel access procedure based on the performance.

Aspect 26: A computer-readable medium for wireless communications by a transmitter user equipment, comprising codes executable to: obtain, from a network entity, a downlink control information (DCI) allocating resources in an unlicensed frequency band for multiple physical sidelink shared channel (PSSCH) transmissions across multiple transmission time intervals (TTIs); perform a listen-before-talk (LBT) channel access procedure in the TTIs; and output, for transmission to at least one receiver UE, one or more PSSCHs in one or more of the TTIs being indicated as passing the LBT channel access procedure based on the performance.

Aspect 27: A network entity, comprising means for performing the operations of one or more of Aspects 13-22.

Aspect 28: A network entity, comprising a transceiver and a processing system including at least one processor configured to perform the operations of one or more of Aspects 13-22.

Aspect 29: An apparatus for wireless communications by a network entity, comprising: an interface configured to output, for transmission to a transmitter user equipment (UE), a downlink control information (DCI) allocating resources in an unlicensed frequency band for multiple physical sidelink shared channel (PSSCH) transmissions across multiple transmission time intervals (TTIs), and obtain, from the transmitter UE, hybrid automatic repeat request (HARQ) feedback for the one or more PSSCH transmissions.

Aspect 30: A computer-readable medium for wireless communications by a network entity, comprising codes executable to: output, for transmission to a transmitter user equipment (UE), a downlink control information (DCI) allocating resources in an unlicensed frequency band for multiple physical sidelink shared channel (PSSCH) transmissions across multiple transmission time intervals (TTIs); and obtain, from the transmitter UE, hybrid automatic repeat request (HARQ) feedback for the one or more PSSCH transmissions.

The techniques described herein may be used for various wireless communications technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node such as a BS or UE may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120*a* and/or processors 220, 230, 238, and/or controller/processor 240 of the BS 110*a* shown in FIG. 2 may be configured to perform operations 600 of FIG. 6 and operations 700 of FIG. 7.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for determining, means for performing, means for deriving and means for mapping may include a processing system, which may include one or more processors, such as processors 258, 264 and 266, and/or controller/processor 280 of the UE 120*a* and/or processors 220, 230, 238, and/or controller/processor 240 of the BS 110*a* shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a transmitter user equipment (UE), comprising:
receiving, from a network entity, a downlink control information (DCI) allocating resources in an unlicensed frequency band for multiple physical sidelink shared channel (PSSCH) transmissions across multiple transmission time intervals (TTIs);
performing a listen-before-talk (LBT) channel access procedure in the multiple TTIs; and
transmitting, to at least one receiver UE, one or more PSSCHs in one or more of the multiple TTIs being indicated as passing the LBT channel access procedure based on the performance.

2. The method of claim 1, wherein the multiple TTIs comprise continuous slots.

3. The method of claim 2, wherein the continuous slots are indicated by a time domain resource allocation (TDRA) table or a time resource assignment in a sidelink control information (SCI) field of the DCI.

4. The method of claim 1, wherein:
the DCI indicates a hybrid automatic repeat request (HARQ) identifier (HARQ ID); and
the method further comprises deriving a HARQ ID for each of the one or more PSSCHs based on the HARQ ID indicated in the DCI.

5. The method of claim 1, wherein:
each of the one or more PSSCHs is scheduled with sidelink control information (SCI) associated with a new data indicator (NDI) bit to indicate whether a corresponding transport block (TB) contains new data or is a retransmission.

6. The method of claim 1, wherein:
an initial transmission of each of the one or more PSSCHs is transmitted on a same starting subchannel.

7. The method of claim 1, wherein:
each retransmission of the one or more PSSCHs has a same frequency allocation as an initial transmission of the same PSSCH.

8. The method of claim 1, wherein:
each of the one or more PSSCH transmissions shares a same time resource assignment field; and
the method further comprises determining time domain resources for a retransmission of the one or more PSSCHs based on at least one rule.

9. The method of claim 8, wherein:
the DCI allocates time domain resources for a first burst of PSSCHs for initial transmission and indicates a time domain offset between a first PSSCH of the first burst and a first PSSCH of a first burst of a second burst of PSSCHs for retransmission; and
the at least one rule indicates that each PSSCH in the second burst is offset by the same time domain offset from a corresponding PSSCH in the first burst.

10. The method of claim 1, wherein:
the DCI indicates a sidelink assignment index (SAI) value for a first PSSCH of the one or more PSSCHs; and
the method further comprises deriving a SAI value for each of the remaining one or more PSSCHs based on the SAI value indicated in the DCI.

11. The method of claim 1, further comprising:
receiving, from the receiver UE, one or more physical sidelink feedback channels (PSFCHs) associated with the one or more PSSCH transmissions;
mapping hybrid automatic repeat request (HARQ) bits in the one or more PSFCHs to a HARQ codebook used for providing physical uplink shared channel (PUSCH) physical uplink control channel (PUCCH) HARQ feedback; and
transmitting, to the network entity, a feedback for the one or more PSSCH transmissions based on the mapping.

12. The method of claim 11, wherein:
when one of the multiple TTIs fails the LBT channel access procedure based on the performance, the UE sends a negative acknowledgment (NAK) for the corresponding HARQ bit being mapped to the HARQ codebook.

13. A method for wireless communications by a network entity, comprising:
transmitting, to a transmitter user equipment (UE), a downlink control information (DCI) allocating resources in an unlicensed frequency band for multiple physical sidelink shared channel (PSSCH) transmissions across multiple transmission time intervals (TTIs); and
receiving, from the transmitter UE, hybrid automatic repeat request (HARQ) feedback for the one or more PSSCH transmissions.

14. The method of claim 13, wherein the multiple TTIs comprise continuous slots.

15. The method of claim 14, wherein the continuous slots are indicated by a time domain resource allocation (TDRA) table or a time resource assignment in a sidelink control information (SCI) field of the DCI.

16. The method of claim 13, wherein:
the DCI indicates a hybrid automatic repeat request (HARQ) identifier (HARQ ID) for use by the transmitter UE in deriving a HARQ ID for each of the one or more PSSCHs based on the HARQ ID indicated in the DCI.

17. The method of claim 13, wherein:
each of the one or more PSSCHs is scheduled with sidelink control information (SCI) associated with a new data indicator (NDI) bit to indicate whether a corresponding transport block (TB) contains new data or is a retransmission.

18. The method of claim 13, wherein:
an initial transmission of each of the one or more PSSCHs is scheduled for transmission on a same starting subchannel.

19. The method of claim 13, wherein:
each retransmission of the one or more PSSCHs is scheduled for transmission with a same frequency allocation as an initial transmission of the same PSSCH.

20. The method of claim 13, wherein:
each of the one or more PSSCH transmissions shares a same time resource assignment field for use by the transmitter UE in determining time domain resources for a retransmission of the one or more PSSCHs based on at least one rule.

21. The method of claim 20, wherein:
the DCI allocates time domain resources for a first burst of PSSCHs for initial transmission and indicates a time domain offset between a first PSSCH of the first burst and a first PSSCH of a first burst of a second burst of PSSCHs for retransmission; and
the at least one rule indicates that each PSSCH in the second burst is offset by the same time domain offset from a corresponding PSSCH in the first burst.

22. The method of claim 13, wherein:
the DCI indicates a sidelink assignment index (SAI) value for a first PSSCH of the one or more PSSCHs for use by the transmitter UE in deriving a SAI value for each of the remaining one or more PSSCHs based on the SAI value indicated in the DCI.

23. A transmitter user equipment (UE), comprising:
a receiver configured to receive, from a network entity, a downlink control information (DCI) allocating resources in an unlicensed frequency band for multiple physical sidelink shared channel (PSSCH) transmissions across multiple transmission time intervals (TTIs);
a processing system configured to perform a listen-before-talk (LBT) channel access procedure in the multiple TTIs; and
a transmitter configured to transmit, to at least one receiver UE, one or more PSSCHs in one or more of the multiple TTIs being indicated as passing the LBT channel access procedure based on the performance.

24. The transmitter UE of claim 23, wherein at least one of:
- the multiple TTIs comprise continuous slots; or
- the continuous slots are indicated by a time domain resource allocation (TDRA) table or a time resource assignment in a sidelink control information (SCI) field of the DCI.

25. The transmitter UE of claim 23, wherein:
- each of the one or more PSSCH transmissions shares a same time resource assignment field; and
- the processing system is further configured to determine time domain resources for a retransmission of the one or more PSSCHs based on at least one rule.

26. The transmitter UE of claim 25, wherein:
- the DCI allocates time domain resources for a first burst of PSSCHs for initial transmission and indicates a time domain offset between a first PSSCH of the first burst and a first PSSCH of a first burst of a second burst of PSSCHs for retransmission; and
- the at least one rule indicates that each PSSCH in the second burst is offset by the same time domain offset from a corresponding PSSCH in the first burst.

27. The transmitter UE of claim 23, wherein:
- the receiver is further configured to receive, from the receiver UE, one or more physical sidelink feedback channels (PSFCHs) associated with the one or more PSSCH transmissions;
- the processing system is further configured to map hybrid automatic repeat request (HARQ) bits in the one or more PSFCHs to a HARQ codebook used for providing physical uplink shared channel (PUSCH) physical uplink control channel (PUCCH) HARQ feedback; and
- the transmitter is further configured to transmit, to the network entity, a feedback for the one or more PSSCH transmissions based on the mapping.

28. The transmitter UE of claim 27, wherein:
when one of the multiple TTIs fails the LBT channel access procedure based on the performance, the UE sends a negative acknowledgment (NAK) for the corresponding HARQ bit being mapped to the HARQ codebook.

29. A network entity, comprising:
- a transmitter configured to transmit, to a transmitter user equipment (UE), a downlink control information (DCI) allocating resources in an unlicensed frequency band for multiple physical sidelink shared channel (PSSCH) transmissions across multiple transmission time intervals (TTIs); and
- a receiver configured to receive, from the transmitter UE, hybrid automatic repeat request (HARQ) feedback for the one or more PSSCH transmissions.

30. The network entity of claim 29, wherein at least one of:
- the multiple TTIs comprise continuous slots; or
- the continuous slots are indicated by a time domain resource allocation (TDRA) table or a time resource assignment in a sidelink control information (SCI) field of the DCI.

* * * * *